(12) United States Patent
Rick

(10) Patent No.: US 8,002,306 B2
(45) Date of Patent: Aug. 23, 2011

(54) VEHICLE INTERIOR CLADDING WITH AIRBAG COVER

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/753,006

(22) Filed: Apr. 1, 2010

(65) Prior Publication Data

US 2010/0253049 A1 Oct. 7, 2010

(30) Foreign Application Priority Data

Apr. 3, 2009 (DE) .................... 10 2009 016 217

(51) Int. Cl.
*B60R 21/205* (2011.01)
(52) U.S. Cl. .................... 280/728.2; 280/732
(58) Field of Classification Search .............. 180/90; 280/728.2, 728.3, 732; 296/70
See application file for complete search history.

(56) References Cited

U.S. PATENT DOCUMENTS

| | | | | |
|---|---|---|---|---|
| 5,261,692 | A * | 11/1993 | Kneip et al. | 280/728.2 |
| 5,342,088 | A * | 8/1994 | Bauer | 280/728.3 |
| 5,374,079 | A * | 12/1994 | Dukeshire et al. | 280/728.3 |
| 5,460,400 | A * | 10/1995 | Davidson | 280/728.2 |
| 5,676,393 | A * | 10/1997 | Rose | 280/728.3 |
| 6,050,595 | A * | 4/2000 | Knox | 280/728.3 |
| 6,435,542 | B2 * | 8/2002 | Nakashima et al. | 280/728.3 |
| 6,460,874 | B1 | 10/2002 | McDonnell et al. | |
| 6,837,515 | B2 * | 1/2005 | Yaldir | 280/732 |
| 7,014,209 | B2 * | 3/2006 | Muller et al. | 280/728.3 |
| 7,055,850 | B2 * | 6/2006 | Freystedt | 280/728.3 |
| 2002/0096867 | A1 | 7/2002 | Kawakubo et al. | |
| 2004/0232668 | A1 * | 11/2004 | DePue et al. | 280/732 |
| 2006/0012153 | A1 * | 1/2006 | Arleth et al. | 280/728.3 |
| 2006/0214399 | A1 * | 9/2006 | Okamoto et al. | 280/728.3 |
| 2009/0243264 | A1 * | 10/2009 | Kaulbersch | 280/728.3 |
| 2010/0156070 | A1 * | 6/2010 | Takahashi et al. | 280/728.3 |

FOREIGN PATENT DOCUMENTS

| | | |
|---|---|---|
| DE | 10117938 A1 | 10/2002 |
| DE | 10203407 A1 | 8/2003 |
| EP | 0826564 A1 | 3/1998 |
| WO | WO 2007085920 A1 * | 8/2007 |

OTHER PUBLICATIONS

British Patent Office, British Search Report for British Application No. GB 1004595.3, Jul. 14, 2010.

* cited by examiner

*Primary Examiner* — Paul N Dickson
*Assistant Examiner* — Joseph Rocca
(74) *Attorney, Agent, or Firm* — Ingrassia Fisher & Lorenz, P.C.

(57) ABSTRACT

A vehicle interior cladding is provided for one or more vehicle components situated in or adjacent to the vehicle passenger compartment, in particular for the dashboard of a vehicle, with an airbag cover, under which an airbag is arranged in an airbag module for a restraint function. The vehicle interior cladding exhibits at least two separate cladding components that are provided for cladding different areas of one or more arranged vehicle components, in particular for a passenger side dashboard. A first cladding component at least partially envelops the airbag cover and a second cladding component forms a visible boundary line with the airbag cover. An airbag through opening is formed in the vehicle interior cladding at least partially in the area of the boundary line during the deployment of the airbag.

17 Claims, 5 Drawing Sheets

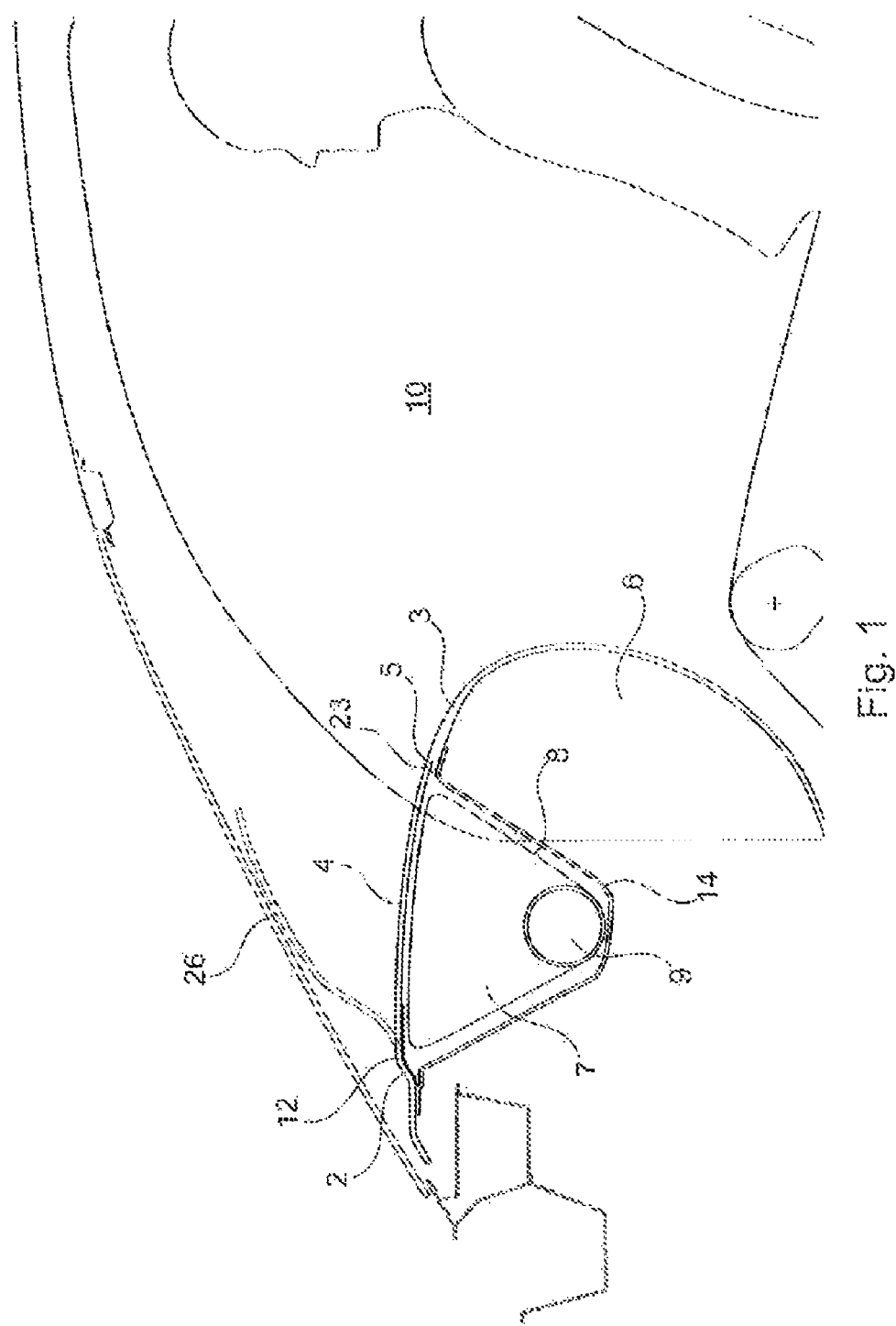

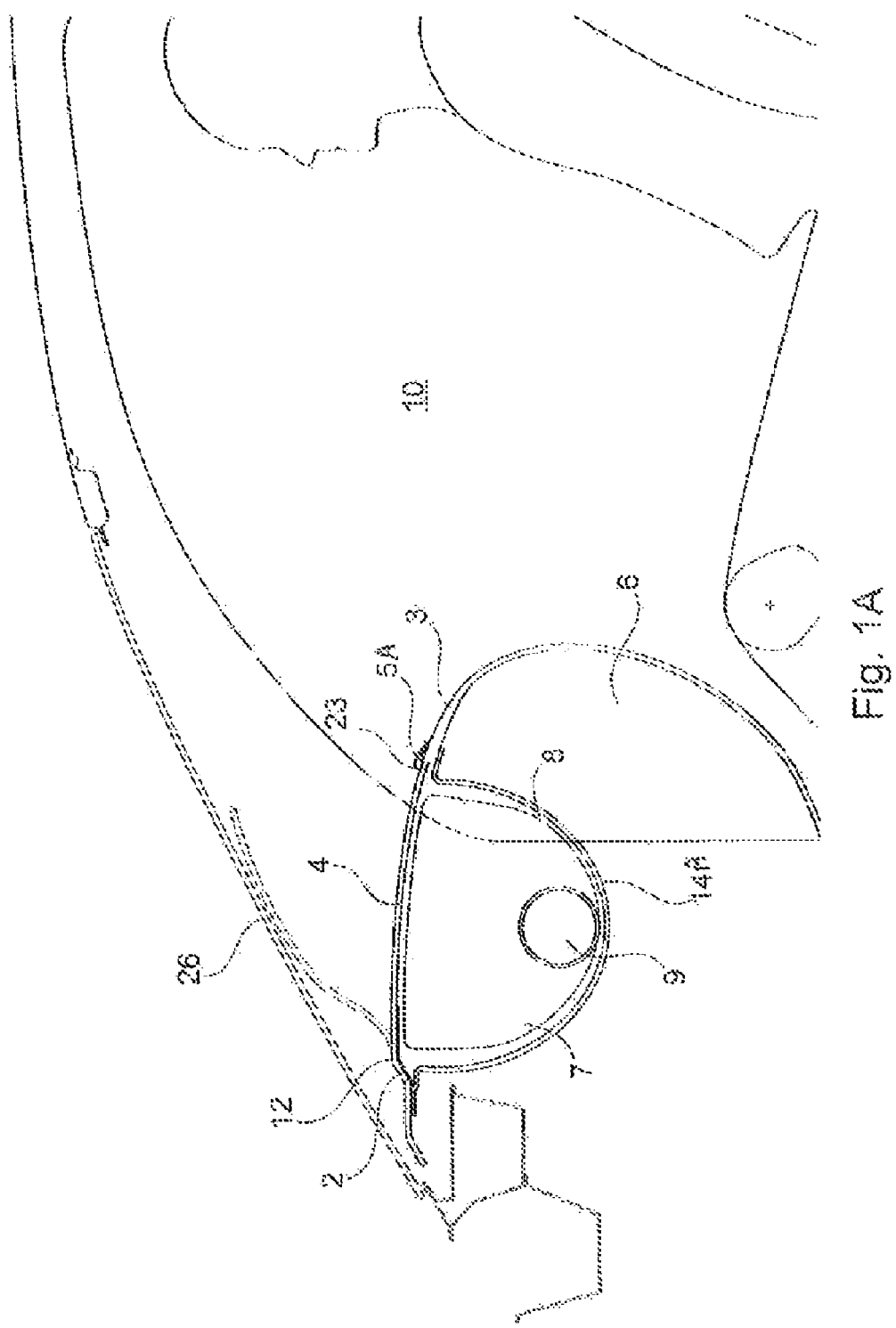

VEHICLE INTERIOR CLADDING WITH AIRBAG COVER

CROSS-REFERENCE TO RELATED APPLICATION

This application claims priority to German Patent Application No. 102009016217.8, filed Apr. 3, 2009, which is incorporated herein by reference in its entirety.

TECHNICAL FIELD

The invention relates to a vehicle interior cladding for one or more vehicle components arranged in or adjacent to the vehicle passenger compartment, in particular for the dashboard of a vehicle, with an airbag cover, under which an airbag is arranged in an airbag module for a restraint function.

BACKGROUND

Vehicle interior claddings with integrated airbag covers are known in the art. In these known solutions, the airbag cover is defined as a partially circumferential rupture line that extends more deeply into the vehicle interior cladding. When the airbag is deployed, the airbag cover is torn open at the rupture lines, causing the airbag cover to pivot around a defined hinge axis and form an airbag through opening in the cladding section, so that the airbag can deploy in the desired way and exert its protective effect. However, the more deeply incorporated rupture lines or perforations can produce imprints on the visible surface of the vehicle interior cladding, which often negatively impact the integrity and quality of the vehicle interior cladding.

Another disadvantage to such airbag covers is that the hinged area is exposed to an extremely high pressure, tensile or bending stresses during airbag deployment, resulting in the danger that the airbag cover fails to open as envisaged during this deployment or becomes damaged. This makes it necessary to reinforce a large area of the hinged area provided between the vehicle interior cladding and airbag cover. However, this additionally required reinforcement leads to increased product costs and additional weight, which is undesired, in particular since this further increases the mass of the airbag cover as well, in turn having a negative influence on the airbag deployment.

The airbag cover or flap can further be deflected to such an extent and exhibit such a level of accelerated inertia force during airbag deployment as to potentially damage the windshield. In addition, this can damage the airbag itself, which in the most extreme of cases can cause the safety system to fail.

Known from DE 102 03 407 is an airbag cover with preformed weakening structures, which hare held together by a fabric structure on a plastic carrier. Further known from DE 101 17 938 is an interior cladding section in which an airbag cover is flatly arranged over an airbag. When the correspondingly arranged gas generator is actuated, the gas flows through the provided openings in the airbag, and lifts the airbag cover from below, accompanied by a bulging and tearing of rupture lines away from the vehicle interior cladding.

At least one object of the invention is to further develop a vehicle interior cladding of the kind mentioned at the outset in such a way as to make the process of assembling the vehicle interior cladding as simple, weight-economizing, cost-effective and functionally optimized as possible, wherein the multiple sections comprising the vehicle interior cladding are to be used to form a rupture line on the airbag cover. In addition, it is other objects, desirable features, and characteristics will become apparent from the subsequent summary and detailed description, and the appended claims, taken in conjunction with the accompanying drawings and this background.

SUMMARY

According to an embodiment of the invention, the at least one object, other objects, desirable features, and characteristics, is achieved by virtue of the fact that the vehicle interior cladding exhibits at least two separate cladding components, which are provided for cladding various areas of one or more arranged vehicle components, in particular for a passenger side dashboard, wherein a first cladding component at least partially envelops the airbag cover, and a second cladding component forms a visible boundary line with the airbag cover, and wherein an airbag through opening is formed in the vehicle interior cladding at least partially in the area of the boundary line during the deployment of the airbag.

Therefore, the cladding components involve flat cladding sections of the vehicle interior cladding, and not purely support, centering or gap covering means for the airbag cover. Vehicle components to be provided with cladding can here be front, side, roof, back or seat areas of the vehicle passenger compartment, in which restraint devices can be provided for the passengers.

Using a natural material separation that is present between two cladding components anyway to form a rupture line in the airbag cover makes the manufacture of the vehicle interior cladding with a restraint function more cost effective and simple than for a vehicle interior cladding with incorporated rupture lines for the airbag cover. Therefore, an embodiment of invention essentially involves designing and mutually arranging the cladding components and airbag cover in such a way that edge contours, ends, or sides, present on the cladding components anyway are used to form a functioning rupture line for the airbag cover.

The application of perforations or weakening zones that are already integrated in conventional vehicle interior claddings is eliminated or significantly reduced in the embodiment of invention. A perforation is today usually introduced using expensive and complicated machining equipment, for example, via laser treatment. The machine cycle times are high, and the machine hour rates are correspondingly cost-intensive. Laser treatment is eliminated or tangibly reduced if the rupture line necessary for the airbag cover is at least partially formed via the corresponding formation and positioning of a second cladding component, wherein the naturally present contours of the cladding components serve as the rupture line in the area of the airbag cover with the formation of a boundary line.

The boundary line can be advantageously used with respect to the opening response of the airbag cover due to the multipart, i.e., at least two-part structural design, since the resistance to the airbag cover flipping open is close to zero in this boundary area. As a result, the opening response can take place reproducibly in the envisaged manner. The natural element separation hence makes it possible to optimize the opening response in an ideal manner.

In a further embodiment of the invention, the first and second cladding components are made out of different materials. For example, the first cladding section or second cladding section can here be made out of an injection molded part, while the respective other cladding component can be made out of a foamed material, which permits a greater stylistic leeway for the designers of vehicle interior cladding sections.

In a further embodiment of the invention, the first and/or second cladding component exhibit a multi-layer, varyingly foamed structural design. The one cladding section can exhibit a softer structure, for example, since it is situated in greater proximity to the vehicle passengers, and is intended to generate an improved haptics or more cushioned effect.

In an especially preferred embodiment, at least the airbag cover has an elastically or plastically deformable surface, and/or can be expanded in at least a prescribed direction, for example transverse to the vehicle direction when arranged on a dashboard. The areas of the first cladding component bordering the airbag cover can also exhibit a corresponding elastically or plastically deformable surface. The airbag cover thereby at least partially creates an airbag through opening just along the boundary line where a natural material separation is provided relative to the adjacent second cladding component. The airbag cover remains coherently connected at least partially on its periphery with the surface material of the vehicle interior cladding of the first cladding, and lifts up and away only from the remaining vehicle interior cladding in response to the pressure exerted by the airbag, so that the airbag can freely deploy through the airbag through opening into the vehicle passenger compartment to protect the vehicle passengers.

In an advantageous embodiment, the airbag cover is designed as a flap. During airbag deployment, such a flap tears out of the first cladding component along the rupture lines defined on its periphery, and folds up around a defined hinge axis, forming an opening for the airbag to pass through. The rupture line for the airbag through opening is here formed by the natural boundary line at least partially at the boundary to the second cladding component.

In another preferred embodiment, stylistic design concepts can have the airbag cover exhibit additional rupture lines adjacent to the opening area or boundary line that essentially separate the airbag cover laterally from the first cladding component, in particular enclosing at least one side that also forms an airbag through opening. This enlarges the rupture line, since the latter is laterally bordered and provided in addition to the natural boundary line. As a consequence, there is only a partial material weakening caused by the perforation on the first cladding component, for example through laser treatment.

In the best of cases where no further rupture lines are required on the airbag cover, for example those formed by perforations, the airbag cover on the first cladding component is only hinged, separated by a natural material separation from the second cladding section at the other or continuous edges, and situated adjacent thereto.

In a simple and inexpensive embodiment, the airbag cover along with the first and/or second cladding components are designed as injection molded parts.

In order to create a soft surface on the cladding section, the first and/or second cladding component can be designed as foamed elements.

To allow the airbag cover to swivel up during airbag deployment, the airbag cover is secured hinge-like or hinged to the surrounding area of the first cladding component so that it can pivot or rotate.

One inexpensive preferred embodiment that economizes on weight provides that the hinge be designed like a net. The net can extend into or beyond the area of the hinge axis of the airbag cover, and injected, cast, or welded into the first cladding component and/or the airbag cover, or bonded thereto.

In a preferred embodiment, the airbag cover exhibits tear-open weakening zones arranged laterally outside the hinged area and boundary line as additional rupture lines, which in the first cladding section are provided at least partially on the periphery of the airbag cover. This provides an easy way to integrate an airbag cover into the first cladding component with minimal laser treatment.

In an embodiment of the invention, detachable clips are used to connect the airbag cover with the second connecting element along at least the boundary line, at least at the end forming the airbag through opening, in particular in the area of the boundary line. In this area, the clips provide a relatively secure connection between the first and second cladding components, which are naturally separated due to the multi-part design. The clips detach upon deployment of the airbag under a defined and reliably reproducible force, so that the airbag cover can open or flip open quickly, and the airbag can freely deploy inside the vehicle passenger compartment.

In an alternative, the first and second cladding components are detachably secured to each other in a type of tongue and groove connection, in particular in the area of the boundary line where the airbag through opening comes about. The tongue and groove connection 5A (See, FIG. 1A) is here flexible enough to be easily detached when the deploying airbag presses against the airbag cover. However, the tongue and groove connection 5A is stable enough in design to withstand mechanical stresses that arise during normal driving. For example, given an airbag deployment, the spring of the cladding section is detached or "peeled" from the groove.

In a preferred embodiment, the airbag module is secured to the bottom side of the vehicle interior cladding. The vehicle interior cladding can hence be completely preassembled with the airbag module, and put together in the vehicle on the assembly line in a single step. This simplifies assembly, since the airbag module is separately mounted on the vehicle interior cladding.

In another preferred embodiment, the second cladding component is designed so that, during the deployment process, adjacent to the boundary line or in the area of the airbag through opening, it can be flexibly adjusted opposite the direction in which the airbag cover opens, for example upwardly, and opposite this opening direction, for example downwardly. As a result, the airbag through hole forms more rapidly during airbag deployment, and enlarged with a lower expenditure of force by the deploying airbag.

In order to design the second cladding section so that it can be adjusted or lowered during the deployment process in the area of the boundary line, an airbag module carrier is provided with a V or U-shaped cross section, and secured at one longitudinal side of a free leg with the first cladding component, and at an opposing side of the second free leg to the second cladding component. The legs can here be directly or indirectly connected with the cladding components by means of mounting elements. As the airbag deploys, the legs exert a tensile force on the cladding sections that acts opposite the deployment direction. Since the attachment point on the first cladding section lies close to a windshield cross member, this area of the first cladding section is stiffer in design. The second cladding section is not as stable in design in the area of the attachment point or at least in the area of the boundary line, so that the second cladding section can give against the airbag deployment direction, at least in the area of the boundary line. Therefore, the airbag through opening in the area of the boundary line forms more quickly and is larger than it would if this area of the second cladding component were not flexible or adjustable in design. The adjustment of the second cladding component in the area of the boundary line can also be initiated by predefined weakening zones or lines.

In a further embodiment of the invention, the vehicle interior cladding is alternatively placed on an airbag module secured to a cross member, providing for a positioning or fixation relative to the vehicle. In this embodiment, the airbag module is already secured to the cross member beforehand, so that the vehicle interior cladding is merely placed over it during its assembly.

In another embodiment of the invention, the second cladding section can also encompass an airbag cover that can be upwardly swiveled or torn by a deploying airbag, and abuts with one side or edge area against the airbag cover of the first cladding component in the area of the boundary line. Therefore, the airbag cover as a whole consists of two airbag flaps, wherein the one airbag flap is arranged in the first cladding component, and the second airbag flap is arranged in the second cladding component. The boundary line separates both airbag flaps from each other. For example, the boundary line can be centrally situated. This type of configuration easily allows a designer greater leeway in designing the vehicle interior cladding or dashboard.

In order to facilitate the process of tearing open the airbag cover, so-called guide vanes can be provided, which improve how a force is applied to the airbag cover to rip open the rupture lines. The tearing force is generated by inflating the airbag with the gas generator. The guide vanes can be provided on the airbag module or on the vehicle interior cladding and/or on the airbag cover.

In order to ensure that the component geometry exhibits the required elasticity and stiffness, the cladding components are advantageously made out of thermoplastic olefins (TPO) or elastomers (TEP) or polycarbonate.

The embodiments of the invention make it possible to swivel the airbag cover up with little application of force. Hence, the swiveling or acceleration forces are at a lower level. The undesired hard impact on the windshield is avoided. The natural boundary line reduces the required perforation on the vehicle interior cladding to a minimal length. As a result, processing on corresponding machining equipment, such as laser perforation machines, is tangibly shortened, so that the cycle time for manufacturing vehicle interior cladding according to an embodiment of the invention is advantageously cut.

Of course, the features mentioned above and yet to be described below can be used not just in the respectively indicated combination, but also in other combinations.

BRIEF DESCRIPTION OF THE DRAWINGS

The present invention will hereinafter be described in conjunction with the following drawing figures, wherein like numerals denote like elements, and:

FIG. 1 is a schematic cross sectional view of a front interior space of a vehicle on the passenger side with a vehicle interior cladding in the area of a dashboard; FIG. 1A is a schematic cross sectional view of a front interior space of a vehicle on the passenger side with a vehicle interior cladding in the area of a dashboard according to another embodiment.

DETAILED DESCRIPTION

Figure 2:
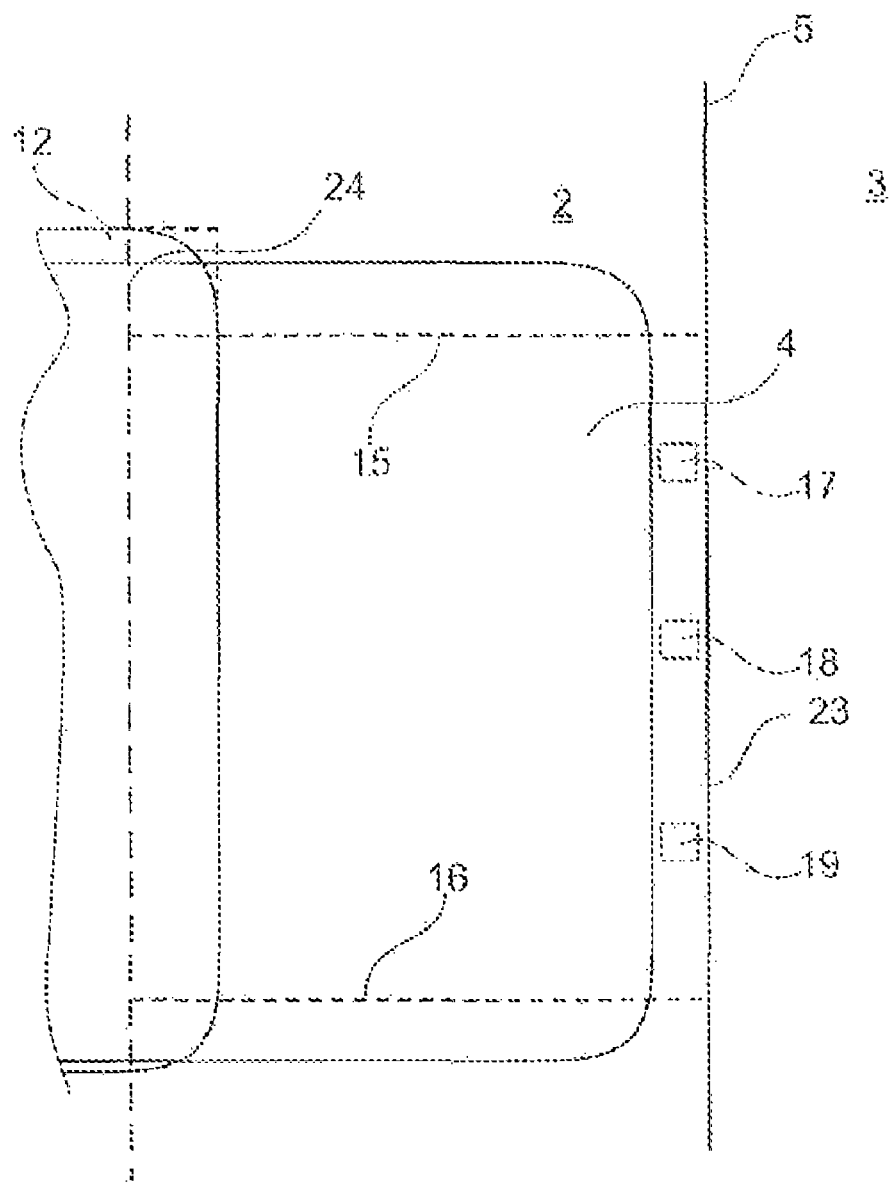
FIG. 2 is a schematic top view of the area of the airbag cover according to FIG. 1.

The following detailed description is merely exemplary in nature and is not intended to limit application and uses. Furthermore, there is no intention to be bound by any theory presented in the preceding background or summary or the following detailed description.

On FIG. 1, the front area of a vehicle is depicted schematically with a dashboard 6 arranged in the vehicle passenger compartment 10 as well as a vehicle interior cladding 1 in longitudinal section relative to the vehicle dimensions. The vehicle interior cladding 1 essentially consists of two cladding components 2, 3. A first cladding component 2 here comprises an airbag cover 4, which is made out of an injected material, and covers an airbag module 8 situated underneath.

The airbag cover 4 is integrated into the first cladding component 2, and exhibits perforations 15, 16 that are hidden viewed from above, but incorporated on the bottom side as depicted on FIG. 2. At an end 23 facing the passengers, the airbag cover 4 forms a shared boundary line with the second cladding component 3, acting as a rupture line to enable the formation of an airbag through opening 20 during deployment of the airbag 7 (as schematically shown in FIG. 1A). This boundary line 5 is a natural separating line between the cladding components 2, 3. The second cladding component 3 consists of a material other than the airbag cover 4, a foamed material in this specific exemplary embodiment. The second cladding component 3 is designed so that it can be lowered slightly inwardly into the dashboard 6 in the area of the boundary line 5 opposite the deployment direction of the airbag 7 during deployment of the airbag 7 by the gas generator 9. The airbag 7 and gas generator 9 are housed in an airbag module 8.

The airbag module 8 essentially comprises the gas generator 9 and airbag 7, and is arranged in a carrier 14 and connected thereto. The gas generator 9 is activated upon detection of an accident, and fills the airbag 7 with gas. The force of the gas generator 9 detaches the airbag cover 4 from the second cladding component 3 along the boundary line, allowing the airbag 7 to deploy in the vehicle passenger compartment 10.

The end of the airbag cover 4 opposite the boundary line 5 is connected like a hinge with the first cladding component 2. The hinge-like attachment is reinforced from the bottom side by a hinge net band 12 with a flexible design. The hinge net band 12 makes it possible to reliably flip open the airbag cover 4.

As a result, of the natural boundary line 5, the opening or tearing force that the airbag 7 must exert in the area of the end 23 is minimized or nearly eliminated, thereby already providing a defined opening path for the airbag 7. The boundary line 5 further enables a more rapid production and assembly of the vehicle interior cladding 1, since expensive machining times for the vehicle interior cladding 1 are avoided thanks to a laser perforation along the end 23 of the airbag cover 4 that creates an airbag through opening 20.

The airbag module 8 is held by a carrier 14 that runs in the transverse direction of the vehicle, and exhibits a V-14 or U-14A (See, FIG. 1A) or similarly shaped cross section with two legs, wherein the free end of a first leg is secured on the bottom side of the first cladding component 2 along the windshield 26 or along the hinge net band 12. On the opposite side, the free end of the second leg secures the carrier 14 to the second cladding component 3, on the bottom side underneath the boundary line 5. Therefore, the airbag cover 4 and the airbag module 8 are arranged between the legs of the carrier 14 or its attachment points on the cladding components 2, 3.

The deploying airbag 7 exerts pressure on the carrier 14 on the one hand, and on the airbag cover 4 on the other, so that the pressure from the airbag 7 also transfers force to the second cladding component 3, allowing the latter to be lowered by a defined amount into the dashboard at the boundary line 5, opposite the deployment direction of the airbag 7. This lowering can be enabled by elasticity in the cladding component 3 or specific structural measures in the area of the boundary line 5.

FIG. 2 shows a schematic top view of the area of the airbag cover 4 according to FIG. 1. In the first cladding component 2, the material of the bottom side is weakened by means of perforations 15, 16, which are depicted with dashed lines. The perforations 15, 16 are adjacent to the boundary line 5, thereby forming lateral rupture points on the airbag cover 4. The perforations 15, 16 are fabricated by means of a laser-machining device. The side of the airbag cover 4 lying opposite the boundary line has secured to it a hinge net band 12 in the hinge area or in the area of the hinge axis 24 on the bottom sides of the airbag cover 4 and cladding component 2. The hinge net band 12 can also be cast, injected or welded into or onto the material of the first cladding component 2 and airbag cover 4. The hinge net band 12 in conjunction with the hinge area of the airbag cover 4 forms the hinge axis 24, around which the airbag cove 4 swivels as the airbag deploys.

A dashed rectangular shape depicts releasable or tear-open clips 17, 18, 19 in the area of the end 23. In the area of the boundary line 5, the clips 17, 18, 19 connect the end 23 of the airbag cover 4 with an overlapping area of the second cladding component 3. The second cladding component 3 overlaps the airbag cover 4 from the bottom side. In this area, the releasable clips 17, 18, 19 are designed and arranged in such a way as to protect the airbag cover 4 against improper treatment. In other words, the airbag cover 4 can only be damaged or opened given a deployment of the airbag 7, and not from outside as the result of unintended manipulation.

Figure 3:
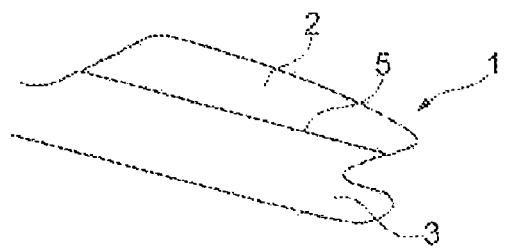
FIGS. 3 to 9 are various points in time during the deployment of an airbag based on a first design of the vehicle interior cladding according to an embodiment of the invention.
Figure 7:
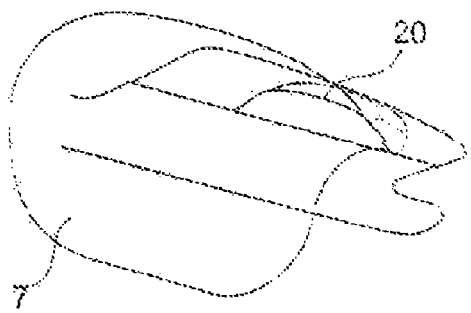

FIG. 3 to FIG. 9 show a first embodiment of the vehicle interior cladding 1 according to the invention in a perspective view. FIG. 3 shows a section of a dashboard on the passenger side with a first cladding component 2 and a second cladding component 3, which abut each other and form a shared, visible boundary line 5 that runs in the longitudinal direction of the dashboard.

Figure 4:
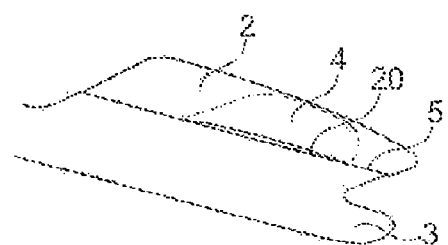
Figure 8:
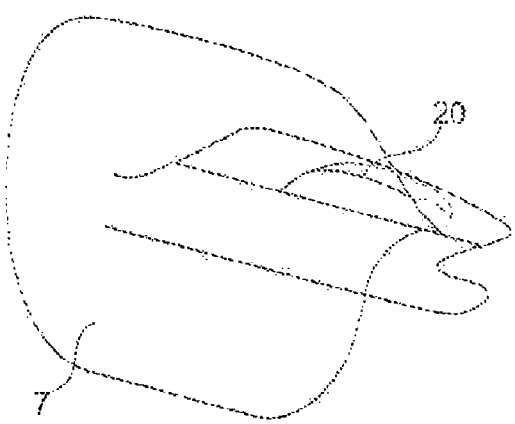

FIG. 4 shows a still barely visible first step during the deployment of the airbag 7, wherein the airbag 7 lightly pushes up the airbag cover 4. The airbag cover 4 consists of a defined, plastically expandable material, and exhibits only a rupture line formed in the area of the boundary line 5 via natural material separation. This results in the formation of an airbag through opening 20 on the boundary line 5. FIG. 4 already denotes a gap at the boundary linen 5, which on the ensuing FIG. 5 to FIG. 9 develops into a sufficiently large airbag through opening 20 due to plastic deformation of the airbag cover 4.

Figure 5:
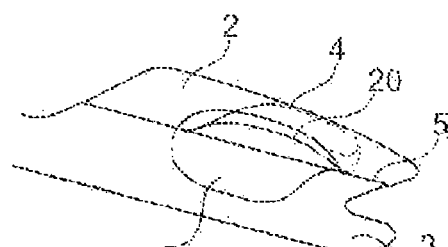
Figure 6:
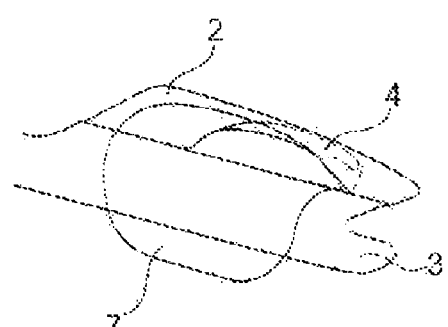
Figure 9:
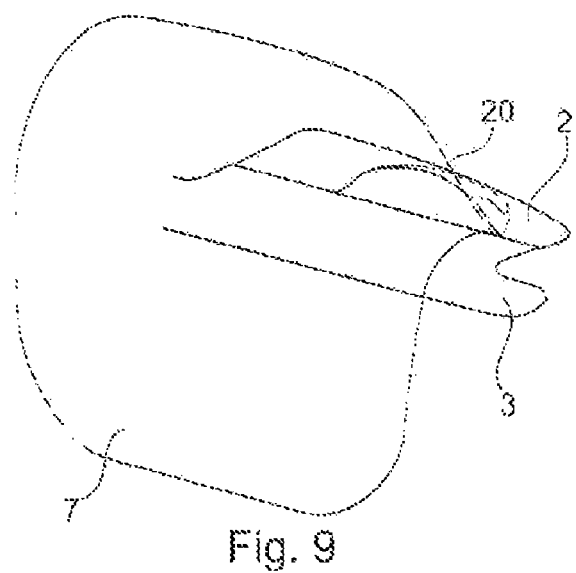
Figure 10:
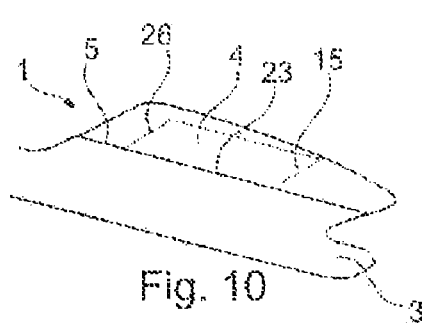
FIG. 10 to FIG. 17 are various points in time during the deployment of an airbag based on a second design of the vehicle interior cladding according to an embodiment of the invention.
Figure 15:
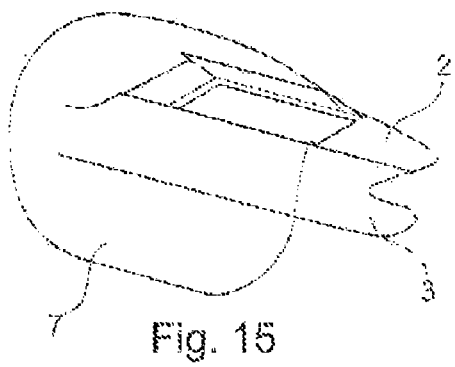

FIG. 5 shows an airbag 7 already exiting from the airbag through opening 20. For this purpose, the airbag cover 4 has plastically advanced further from the remaining cladding component 2. The inflating airbag 7 itself creates a bullet channel in the area of the natural boundary line 5 for deployment into the vehicle interior.

On FIG. 6 to FIG. 9, the airbag 7 deploys to its envisaged maximum size, wherein the airbag cover 4 deforms or plastically expands sufficiently, thereby yielding an airbag through opening 20 of maximum size.

FIG. 10 to FIG. 17 show a special embodiment of the vehicle interior cladding 1 according to the invention. The vehicle interior cladding 1 envelops a first cladding component 2 and a second cladding component 3, as in the first embodiment described above. The first cladding component 2 integrates the airbag cover 4, and the perforations 15, 16 of the airbag cover 4 are designed from below additionally to the rupture point (boundary line 5) provided at the end 23, in such a way as to tear open easily during deployment of the airbag 7. The end 23 creates a through opening, and coincides with the boundary line 5, which extends laterally over the end 23, and separates the first cladding component 2 from the second cladding component 3.

Figure 11:
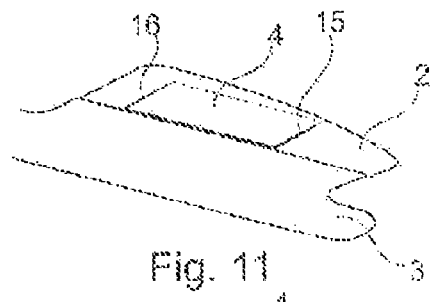
Figure 16:
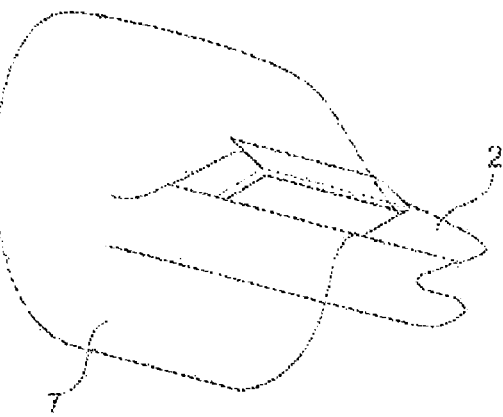

FIG. 11 shows a first stage in which the airbag cover 4 is separated from the first cladding component 2 on the perforations 15, 16.

Figure 12:
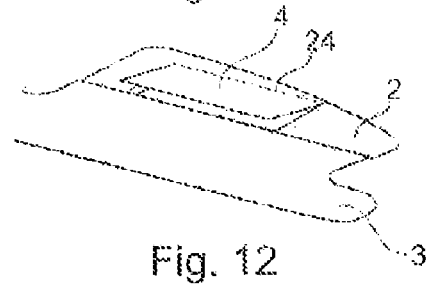
Figure 13:
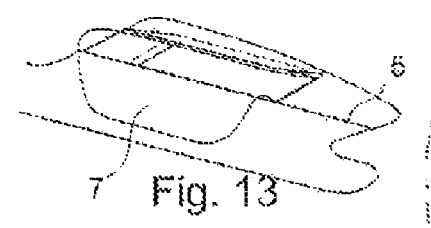
Figure 17:
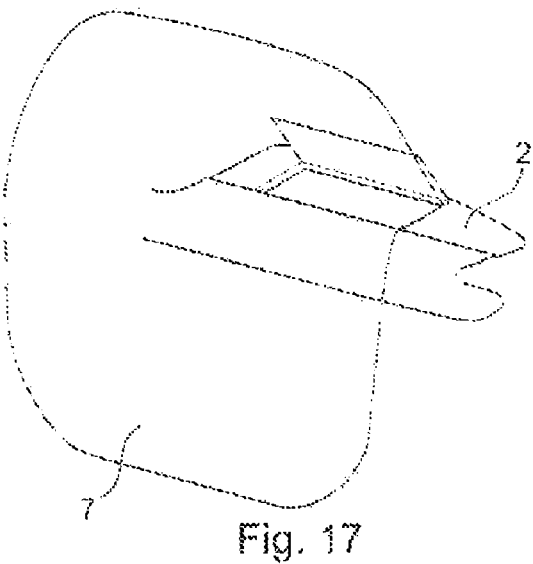
Figure 14:
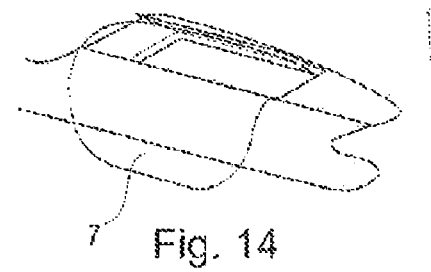

FIG. 12 shows how the airbag cover 4 flips open as an airbag lid along a hinge axis 24. FIG. 13 to FIG. 17 show the chronological sequence in which the airbag 7 deploys from the vehicle interior cladding 1, wherein the airbag cover 4 flips open further and further, maximally abutting the windshield 26 depicted on FIG. 1.

Reference is made in particular to the graphic depictions of the invention, wherein the figures show only schematic and not dimensionally accurate representations.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle interior cladding for one or more vehicle components that is adapted for a passenger compartment of a vehicle that includes an airbag cover under which an airbag is arranged in an airbag module for a restraint function, comprising:

a first cladding component configured to clad the one or more vehicle components, the first cladding component adapted to at least partially envelop the airbag cover; and a second cladding component configured to clad the one or more vehicle components, the second cladding component is configured to form a visible boundary line with the airbag cover, such that an end of the airbag cover shares the visible boundary line with the second cladding component, wherein an airbag through opening is at least partially formed in the vehicle interior cladding at the visible boundary line during a deployment of the airbag.

2. The vehicle interior cladding according to claim 1, wherein the first cladding component and the second cladding component are made out of different materials and the first cladding component and the second cladding component are a foamed structure.

3. The vehicle interior cladding according to claim 1, wherein the first cladding component and the second cladding component are made out of different materials and the first cladding component and the second cladding component are a multi-layer structure.

4. The vehicle interior cladding according to claim 1, wherein at least the airbag cover comprises a plastically deformable surface.

5. The vehicle interior cladding according to claim 4, wherein at least the airbag cover is adapted to expand in a prescribed direction during exposure to the airbag during inflation.

6. The vehicle interior cladding according to claim 1, wherein the airbag cover is a flap that is adapted to pivot around a hinge axis.

7. The vehicle interior cladding according to claim 1, wherein the visible boundary line is a rupture line that comprises a significantly reduced resistance during formation of the airbag through opening.

8. The vehicle interior cladding according to claim 7, wherein the second cladding component is configured to deform outward and away from the airbag cover opening during the deployment of the airbag at least in the area of the visible boundary line.

9. The vehicle interior cladding according to claim 1, wherein the airbag cover is connected with a hinge-like connection to the first cladding component.

10. The vehicle interior cladding according to claim 9, wherein the hinge-like connection is a net.

11. The vehicle interior cladding according to claim 1, wherein a periphery of the airbag cover comprises limitedly developed ruptures that are arranged on a bottom side of the airbag cover.

12. The vehicle interior cladding according to claim 1, wherein the first cladding component and the second cladding component are joined by a tongue-in-groove connection at least in the area of the visible boundary line.

13. The vehicle interior cladding according to claim 1, wherein a carrier of the airbag module is V-shaped viewed in a transverse direction of the vehicle.

14. The vehicle interior cladding according to claim 1, wherein a carrier of the airbag module is U-shaped viewed in a transverse direction of the vehicle.

15. The vehicle interior cladding according to claim 1, wherein at least one of the first cladding component or the second cladding component is made out of a thermoplastic olefin.

16. The vehicle interior cladding according to claim 1, wherein at least one of the first cladding component or the second cladding component is made out of an elastomer.

17. The vehicle interior cladding according to claim 1, wherein at least one of the first cladding component or the second cladding component is made out of a polycarbonate.

* * * * *